(12) United States Patent
Dijkman

(10) Patent No.: US 9,425,683 B2
(45) Date of Patent: Aug. 23, 2016

(54) ADJUSTABLE FLY-BACK OR BUCK-BOOST CONVERTER

(75) Inventor: Willibrordus Jurrianus Dijkman, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 29 days.

(21) Appl. No.: 14/003,243

(22) PCT Filed: Feb. 24, 2012

(86) PCT No.: PCT/IB2012/050861
§ 371 (c)(1),
(2), (4) Date: Sep. 5, 2013

(87) PCT Pub. No.: WO2012/120402
PCT Pub. Date: Sep. 13, 2012

(65) Prior Publication Data
US 2013/0343100 A1    Dec. 26, 2013

(30) Foreign Application Priority Data
Mar. 9, 2011    (EP) ..................................... 11157536

(51) Int. Cl.
*H02M 3/158*    (2006.01)
*H02M 1/42*    (2007.01)
*H02M 3/335*    (2006.01)

(52) U.S. Cl.
CPC .............. *H02M 1/42* (2013.01); *H02M 1/4225* (2013.01); *H02M 1/4258* (2013.01); *H02M 3/158* (2013.01); *H02M 3/33507* (2013.01); *Y02B 70/126* (2013.01); *Y10T 307/858* (2015.04)

(58) Field of Classification Search
USPC ............ 363/21.01, 21.04, 21.1, 21.12, 21.18; 323/234, 265, 282, 284, 285, 299, 300, 323/301
See application file for complete search history.

(56) References Cited

U.S. PATENT DOCUMENTS

| | | | |
|---|---|---|---|
| 4,933,830 A | 6/1990 | Sato et al. | |
| 6,128,205 A | 10/2000 | Bernd et al. | |
| 6,549,432 B1 * | 4/2003 | Giannopoulos et al. | ... 363/21.14 |
| 8,120,347 B1 * | 2/2012 | Cao | ................................ 323/285 |
| 2006/0013026 A1 | 1/2006 | Frank et al. | |

(Continued)

FOREIGN PATENT DOCUMENTS

| | | |
|---|---|---|
| JP | 1219728 A | 9/1989 |
| WO | 9963414 A1 | 12/1999 |
| WO | 2009025517 A2 | 2/2009 |

*Primary Examiner* — Jeffrey Gblende

(57) ABSTRACT

In fly-back and buck-boost converters (21, 22), to reduce distortions and to increase distortion power factors, arrangements (1) are introduced for adjusting control signals generated by controllers (2) for controlling switches (3) of the converters. The arrangements (1), in response to increased/decreased amplitudes of voltage signals from voltage supplies (4) for feeding the converters, increase/decrease durations of conducting times of the switches (3). This way, unwanted losses in the grid and power generators are avoided. The converters are relatively low cost single stage converters. Preferably, the durations are substantially proportional to sums of the amplitudes of the voltage signals and design parameters. These design parameters may comprise amplitudes of other voltage signals such as output voltages. Arrangements (1) are provided for controllers (2) that can only produce fixed durations as well as for controllers (2) that can produce adaptable durations via adaptable external elements.

10 Claims, 4 Drawing Sheets

(56) References Cited

U.S. PATENT DOCUMENTS

| | | |
|---|---|---|
| 2006/0061337 A1* | 3/2006 | Kim et al. .................... 323/205 |
| 2008/0100273 A1* | 5/2008 | Uruno et al. ................. 323/271 |
| 2009/0027025 A1* | 1/2009 | Latham et al. ............... 323/283 |
| 2010/0237786 A1 | 9/2010 | Santo et al. |
| 2010/0264895 A1* | 10/2010 | Weng et al. ................... 323/285 |
| 2010/0308733 A1 | 12/2010 | Shao |
| 2010/0320934 A1 | 12/2010 | Lin et al. |
| 2011/0095733 A1* | 4/2011 | Park .................... H02M 1/4225 323/207 |
| 2011/0267846 A1* | 11/2011 | Djenguerian et al. ..... 363/21.12 |
| 2012/0155132 A1* | 6/2012 | Uno ............................... 363/80 |

\* cited by examiner

ADJUSTABLE FLY-BACK OR BUCK-BOOST CONVERTER

FIELD OF THE INVENTION

The invention relates to an arrangement for adjusting a control signal to be generated by a controller for controlling a switch of a converter, the converter comprising a fly-back converter or a buck-boost converter to be connected to a voltage supply for supplying a voltage signal.

The invention also relates to a controller, fly-back converters or buck-boost converters, devices, a method, a computer program product and a medium.

Examples of such a device are lamps and other consumer products and other professional products.

BACKGROUND OF THE INVENTION

US 2010/0308733 A1 discloses an apparatus and a method for a constant-power offline light-emitting diode driver. A single-stage integrated circuit drives light emitting diode sources in a constant power mode to eliminate the need for light emitting diode current sensing, while re-shaping the waveform of the inductor current near line zero crossing to achieve a high power factor.

From FIG. 6 of US 2010/0308733 A1 it can be derived that the apparatus and the method suffer from a relatively low distortion power factor. Such a relatively low distortion power factor corresponds to relatively much distortion.

SUMMARY OF THE INVENTION

It is an object of the invention to provide an arrangement for adjusting a control signal to be generated by a controller for controlling a switch of a converter that has a relatively high distortion power factor. Such a relatively high distortion power factor corresponds to relatively little distortion.

Further objects of the invention are to provide a controller, fly-back converters or buck-boost converters, devices, a method, a computer program product and a medium.

According to a first aspect of the invention, an arrangement is provided for adjusting a control signal to be generated by a controller for controlling a switch of a converter, the converter comprising a fly-back converter or a buck-boost converter to be connected to a voltage supply for supplying a voltage signal, the arrangement comprising a circuit to be connected to the controller for, in response to an increased amplitude of the voltage signal, increasing the duration of the conducting time of the switch and for, in response to a decreased amplitude of the voltage signal, decreasing the duration of the conducting time of the switch.

By increasing the duration of the conducting time of a switch of a fly-back converter or a buck-boost converter in the case that an (instantaneous) amplitude of a voltage signal from a voltage supply has increased, and by decreasing the duration of the conducting time of the switch in the case that the (instantaneous) amplitude of the voltage signal from the voltage supply has decreased, the fly-back converter or the buck-boost converter will have an increased distortion power factor. By reducing the distortion of the fly-back converter or the buck-boost converter, unwanted losses in the grid and power generators are avoided.

The arrangement is further advantageous in that it forms part of a single-stage fly-back converter or a single-stage buck-boost converter. Such single-stage converters are relatively low-cost. With dual-stage solutions comprising power factor circuits and power adapter circuits, distortion can be reduced as well, but these dual-stage solutions are relatively expensive.

According to an embodiment, the arrangement is defined by the duration of the conducting time of the switch being substantially proportional to the sum of the amplitude of the voltage signal and a design parameter. By increasing and decreasing the duration of the conducting time of the switch of the fly-back converter or the buck-boost converter substantially proportionally to the sum of the (instantaneous) amplitude of the voltage signal and a (relatively fixed) design parameter, distortion is further reduced.

Substantially is herein defined as 50%-150%, preferably 75%-125%, more preferably 90%-110%, most preferably 100%. Further, the duration may be substantially proportional to the sum in a stepwise way and/or with hysteresis.

According to an embodiment, the arrangement is defined by the design parameter comprising an amplitude of another voltage signal, wherein, for the converter, being the fly-back converter, comprising a transformer with a primary coil coupled to the switch and with a secondary coil to be coupled to a load, the other voltage signal comprises an output voltage of the secondary coil multiplied by a number of windings of the primary coil and divided by a number of windings of the secondary coil, and wherein, for the converter, being the buck-boost converter, comprising a coil coupled to the switch and to be coupled to the load, the other voltage signal comprises an output voltage of the coil multiplied by a number of windings of an input part of the coil and divided by a number of windings of an output part of the coil. It can be derived that an average input current Iin as supplied to the converter is proportional to the product of an instantaneous amplitude of a voltage signal Uin(t) as supplied to the converter and an amplitude of an output voltage Uout as supplied by the converter to a load multiplied by n (fly-back converter: n is equal to a number of windings of the primary coil divided by a number of windings of the secondary coil; buck-boost converter: n is equal to a number of windings of an input part of the coil divided by a number of windings of an output part of the coil) and the duration D(t) of the conducting time of the switch of the fly-back converter or the buck-boost converter divided by the sum of the instantaneous amplitude of the voltage signal Uin(t) and the amplitude of the output voltage Uout multiplied by n. To reduce distortion, the average input current Iin should be relatively proportional to the instantaneous amplitude of the voltage signal Uin(t). To realize this, the duration D(t) should be relatively proportional to the sum of the instantaneous amplitude of the voltage signal Uin(t) and the amplitude of the output voltage Uout multiplied by n.

Relatively is herein defined as 50%-150%, preferably 75%-125%, more preferably 90%-110%, most preferably 100%. Further, the duration may be relatively proportional to the sum in a stepwise way and/or with hysteresis.

The fact that the duration D(t) should be relatively proportional to the sum of the instantaneous amplitude of the voltage signal Uin(t) and the amplitude of the output voltage Uout multiplied by n is an optimal situation that gives the largest improvements. However, the invention is not limited to this embodiment: Said increase and said decrease of the duration D(t) in the case that an instantaneous amplitude of the voltage signal Uin(t) has increased and decreased, respectively, already substantially improve/increase the distortion power factor.

According to an embodiment, the arrangement is defined by the controller being of a type such that the duration of the conducting time of the switch is fixed, the circuit comprising an input terminal for receiving the voltage signal, an output terminal to be coupled to a control input of the controller, a common terminal, a parallel connection of a first resistor and a first serial connection of a second resistor and a first voltage defining element and a second serial connection of a third resistor and a second voltage defining element, and a current passing element, the parallel connection being coupled to the input terminal and the output terminal, and the current passing element being coupled to the output terminal and the common terminal. For controllers that produce fixed durations of the conducting time of the switch, a clamping circuit comprising the first and second and third resistors and the first and second voltage defining elements and the current passing element may be used to cause the duration D(t) to follow/approximate the instantaneous amplitude of the voltage signal Uin(t) in a stepwise manner. More steps and/or steps of different sizes are not to be excluded.

According to an embodiment, the arrangement is defined by the voltage defining elements, each comprising a diode or a zener diode, and the current passing element comprising a fourth resistor.

According to an embodiment, the arrangement is defined by the controller being of a type such that the duration of the conducting time of the switch is defined by an external element connected to ground, wherein an increased value of the external element results in an increased duration of the conducting time of the switch and a decreased value of the external element results in a decreased duration of the conducting time of the switch. For controllers that produce durations of the conducting time of the switch that depend on an external element, the size/value of this external element may be varied to adjust the duration D(t).

According to an embodiment, the arrangement is defined by the external element being an external resistor, the circuit comprising an input terminal for receiving the voltage signal, an output terminal to be coupled to a control input of the controller, a common terminal, a further terminal to be coupled to a supply terminal of the controller, a first serial connection of a first resistor coupled to the input terminal, a voltage defining element and a second resistor coupled to the common terminal, a first transistor of which a control electrode is coupled to an interconnection between the voltage defining element and the second resistor and of which a first main electrode is coupled to the common terminal and of which a second main electrode is coupled via a third resistor to the further terminal and to a control electrode of a second transistor of which a first main electrode is coupled to the common terminal and of which a second main electrode is coupled via a second serial connection of a fourth resistor and a fifth resistor to the common terminal, an interconnection between the fourth resistor and the fifth resistor being coupled to the output terminal.

According to an embodiment, the arrangement is defined by the external element being an external capacitor, the circuit comprising an input terminal for receiving the voltage signal, an output terminal to be coupled to a control input of the controller, a common terminal, a first serial connection of a first resistor coupled to the input terminal, a voltage defining element and a second resistor coupled to the common terminal, a transistor of which a control electrode is coupled to an interconnection between the voltage defining element and the second resistor and of which a first main electrode is coupled to the common terminal and of which a second main electrode is coupled via a second serial connection of a first capacitor and a second capacitor to the common terminal, an interconnection between the first capacitor and the second capacitor being coupled to the output terminal.

According to a second aspect of the invention, a controller is provided for generating a control signal for controlling a switch of a converter, the converter comprising a fly-back converter or a buck-boost converter to be connected to a voltage supply for supplying a voltage signal, the controller comprising an arrangement for adjusting the control signal as defined above.

According to a third aspect of the invention, a fly-back converter or a buck-boost converter is provided comprising an arrangement as defined above.

According to a fourth aspect of the invention, a fly-back converter or a buck-boost converter is provided comprising a controller as defined above.

According to a fifth aspect of the invention, a device is provided comprising a fly-back converter or a buck-boost converter with an arrangement as defined above and further comprising a load.

According to a sixth aspect of the invention, a device is provided comprising a fly-back converter or a buck-boost converter with a controller as defined above and further comprising a load.

According to a seventh aspect of the invention, a method is provided for adjusting a control signal for controlling a switch of a converter, the converter comprising a fly-back converter or a buck-boost converter to be connected to a voltage supply for supplying a voltage signal, the method comprising a step of, in response to an increased amplitude of the voltage signal, increasing the duration of the conducting time of the switch and, in response to a decreased amplitude of the voltage signal, decreasing the duration of the conducting time of the switch.

According to an eighth aspect of the invention, a computer program product is provided for performing the step of the method as defined above.

According to a ninth aspect of the invention, a medium is provided for storing and comprising the computer program product as defined above.

An insight could be that the duration D(t) should be relatively proportional to the sum of an instantaneous voltage signal Uin(t) and an output voltage Uout multiplied by n.

A basic idea could be that in response to an increased/decreased amplitude of a voltage signal as supplied to the converter, the duration of the conducting time of a switch of the converter should be increased/decreased as well.

The problem of providing an arrangement for adjusting a control signal to be generated by a controller for controlling a switch of a converter that has a relatively high distortion power factor has been solved.

A further advantage could be that the arrangement forms part of a single-stage fly-back converter or a single-stage buck-boost converter that are relatively low-cost.

These and other aspects of the invention will be apparent from and elucidated with reference to the embodiments described hereinafter.

DETAILED DESCRIPTION OF EMBODIMENTS

Figure 1:
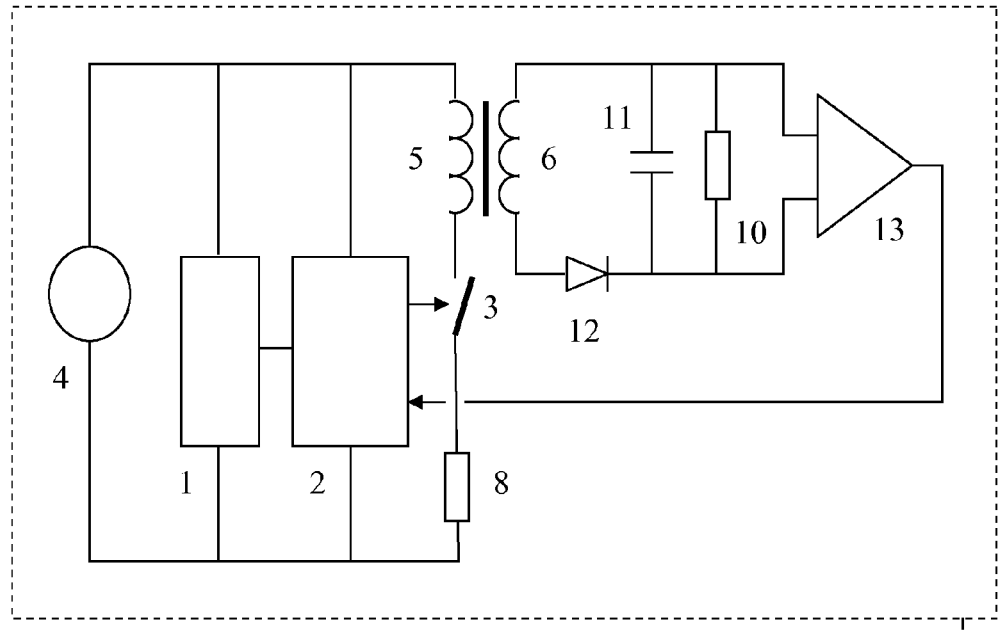
FIG. 1 shows a fly-back converter.

In FIG. 1, a fly-back converter 21 is shown. The fly-back converter 21 comprises a serial connection of a primary coil 5 of a transformer 5, 6 and a switch 3 and a resistor 8 connected to a voltage supply 4 for supplying a voltage signal. The fly-back converter 21 further comprises a controller 2 connected to the voltage supply 4 for controlling the switch 3 via a control signal. The fly-back converter 21 further comprises an arrangement 1 for adjusting the control signal. In addition, the arrangement 1 may be connected to the voltage supply 4 and comprises a circuit connected to the controller 2 for, in response to an increased amplitude of the voltage signal, increasing the duration of the conducting time of the switch 3 and for, in response to a decreased amplitude of the voltage signal, decreasing the duration of the conducting time of the switch 3.

A secondary coil 6 of the transformer 5, 6 is connected to a parallel connection of a load 10 and a capacitor 11 via a diode 12. The load 10 for example comprises one or more light emitting diodes. Across the load 10, an operational amplifier 13 is connected for feeding back information about the load 10 to the controller 2.

Alternatively, the voltage supply 4 may be located partly or entirely outside the fly-back converter 21 and may comprise one or more rectifying diodes and one or more filters. Alternatively, the load 10 and/or the capacitor 11 and/or the diode 12 may be located outside the fly-back converter 21. Alternatively, the arrangement 1 may form part of the controller 2. The switch 3 can be any kind of switch. The resistor 8 is optional and may have a current limiting function and may be located elsewhere and/or may be integrated into the switch 3.

Figure 2:
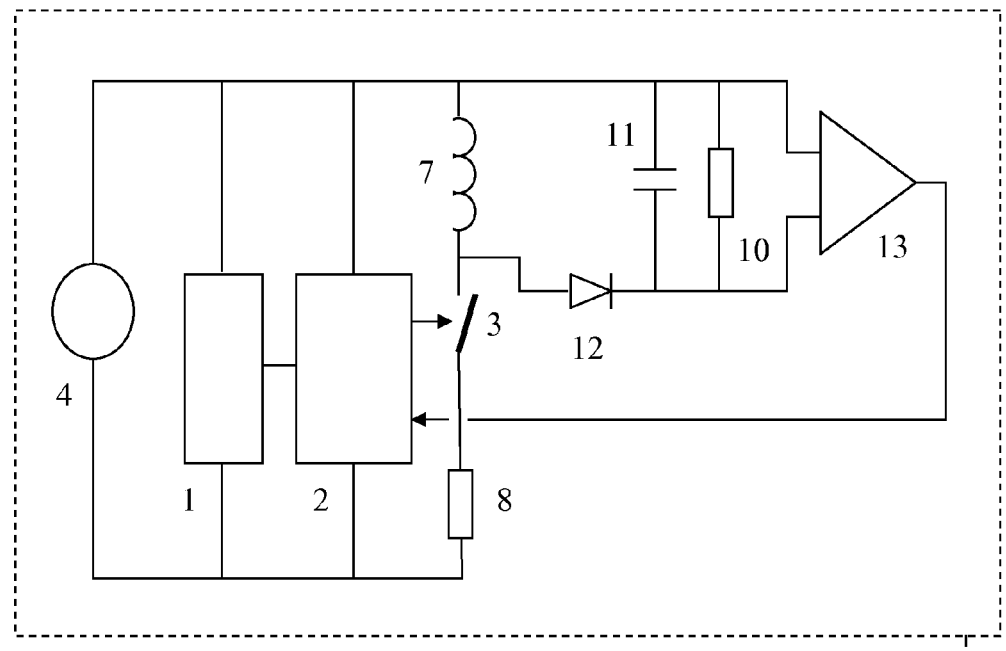
FIG. 2 shows a buck-boost converter.

In FIG. 2, a buck-boost converter 22 is shown. This converter only differs from the one shown in the FIG. 1 in that the transformer 5, 6 has been replaced by a single coil 7. The switch 3 and the load 10 are coupled to end terminals of the coil 7, but alternatively the switch 3 and/or the load 10 may be coupled to an intermediate terminal of the coil 7.

As known in the art, for fly-back converters 21 and buck-boost converters 22, three modes of operation exist: A Continuous Conduction Mode, a Discontinuous Conduction Mode and a Boundary Mode, also called Transitional Mode or Critical Conduction mode. The name of the mode refers to the combined currents in the primary and secondary coils 5, 6 or to the current in the coil 7. In the Continuous Conduction Mode, this current is always flowing and does not become zero during a switching cycle. In the Discontinuous Conduction mode, the current becomes zero during a substantial part of the switching cycle. In the Boundary Mode, a new switching cycle is started at the moment that the combined currents become zero or that the current becomes zero.

The controller 2 controls the switch 3 such that an output voltage Uout as supplied to the load 10 is constant, independent of an output current Iout and an input voltage Uin(t) (the voltage signal as supplied by the voltage supply 4). In addition, the duration D(t) of the conducting time of the switch 3 is controlled. Further, it is possible to control the output current Iout or the output power, whichever is needed in the application. For light emitting diode applications, usually the output current Iout is controlled. A total switching period will be referred to as T(t). The output current Iout through the load 10 is smoothed by the capacitor 11 and is virtually a direct current. The input current Iin(t) of the converter (the current which is delivered by the voltage supply 4) will carry high frequency switching phenomena, so it will be time-dependent with respect to the switching cycle. It will also follow the variations of Uin(t) when the controller 2 adapts D(t) to keep the parameters of the converter to the prescribed values. An average input current Iav-in(t) will have the same frequency or period as the time-varying input voltage Uin(t). For this application, Uin(t) varies usually with a frequency of 100 Hz or 120 Hz (rectified mains voltage) while the switching phenomena of the converter may have a frequency in the range of, for example 50 kHz to 100 kHz. It will be assumed that the output voltage Uout and the average output current Iav-out are a direct output voltage and a direct output current, respectively, and that they are not time-dependent. The inductance of the primary coil 5 or of the coil 7 is referred to as L. For this case it can be derived that (neglecting switching and conducting losses):

$$D(t)=T(t)*Uout/(Uout+Uin(t))$$

$$Ipeak\text{-}coil(t)=D(t)*Uin(t)/L$$

$$Iav\text{-}in(t)=(D(t)/T(t))*Ipeak\text{-}coil(t)/2=D(t)^2*Uin(t)/(2*T(t)*L)$$

This can be converted into:

$$Iav\text{-}in(t)=D(t)*Uin(t)*Uout/(2*L*(Uout+Uin(t))).$$

In the case that the transformer ratio is n: 1, Uout will become nUout.

For a general case, this results in:

$$Iav\text{-}in(t)=D(t)*Uin(t)*nUout/(2*L*(nUout+Uin(t))).$$

This is valid for a single-stage fly-back converter in a boundary mode with a relatively constant output voltage Uout and a relatively constant output current. In the case that the single-stage fly-back converter should operate also as power factor controller, it is required that Iav-in(t) will vary substantially proportionally with Uin(t). This leads to the requirement that D(t)*nUout/(2*L*(nUout+Uin(t))) should be relatively constant.

As nUout and L are relatively constant, D(t) needs to be dependent on Uin(t) according to:

$$D(t)=\text{constant}*(nUout+Uin(t)).$$

If this can be implemented in the converter, the lowest possible distortion will be achieved.

In a practical case, deviations are permitted, still leading to a considerable improvement of the distortion. From the above it will be clear that the controller 2 may have two tasks: Adapting D(t) for reducing distortion and adapting an average value of D(t) for keeping the output parameters (Uout, or Iout, or a combination) close to the prescribed values.

So, preferably, the duration D(t) of the conducting time of the switch 3 will be substantially proportional to a sum of the amplitude of the voltage signal Uin(t) and a design parameter. Further, preferably, the design parameter comprises an amplitude of another voltage signal, wherein, for the converter, being the fly-back converter 21, comprising the transformer 5, 6 with the primary coil 5 coupled to the switch 3 and with the secondary coil 6 to be coupled to the load 10, the other voltage signal comprises an output voltage of the secondary coil 6 multiplied by a number of windings of the primary coil 5 and divided by a number of windings of the secondary coil 6, and wherein, for the converter, being the buck-boost converter 22, comprising the coil 7 coupled to the switch 3 and to be coupled to the load 10, the other voltage signal comprises an output voltage of the coil 7 multiplied by a number of windings of an input part of the coil 7 and divided by a number of windings of an output part of the coil 7 (if the coil 7 has end terminals and no intermediate terminals, the input part and the output part of the coil 7 will be equal to each other and to the coil 7).

Figure 3:
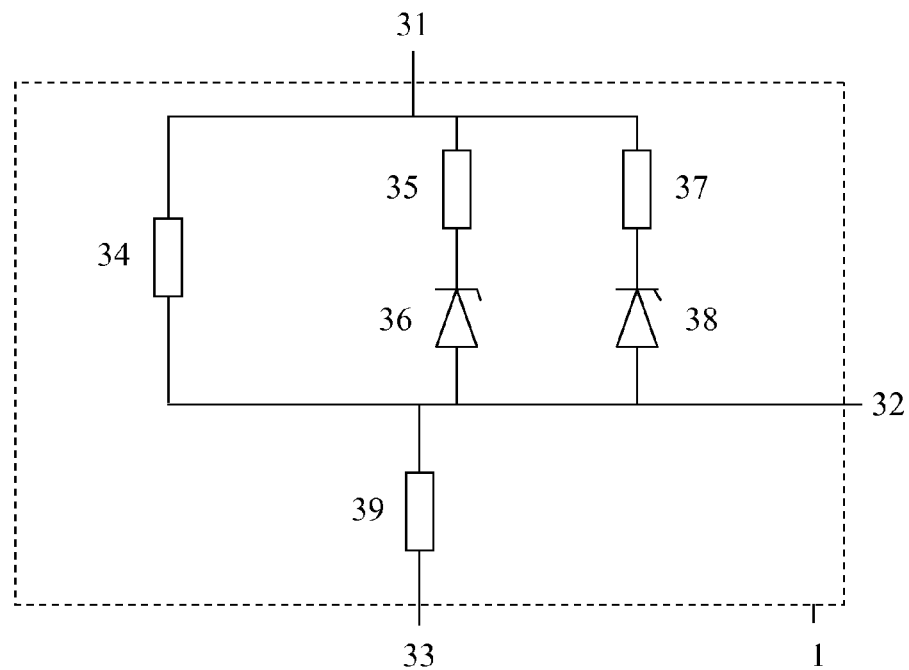
FIG. 3 shows a first arrangement.

In FIG. 3, a first arrangement 1 is shown for a controller 2 of a type such that the duration D(t) of the conducting time of the switch 3 is fixed. Examples of such a controller 2 are the L6562 or the MC34262. These integrated circuits are power factor controllers that have a control input in the form of a multiplier input that is to be connected to the arrangement 1, as shown in the FIG. 3. This arrangement 1 comprises an input terminal 31 for receiving the voltage signal, an output terminal 32 to be coupled to the control input of the controller 2, and a common terminal 33. This arrangement 1 further comprises a parallel connection of a first resistor 34 and a first serial connection of a second resistor 35 and a first voltage defining element 36 and a second serial connection of a third resistor 37 and a second voltage defining element 38, and a current passing element 39. The parallel connection is coupled to the input terminal 31 and the output terminal 32, and the current passing element 39 is coupled to the output terminal 32 and the common terminal 33. Preferably, the voltage defining elements 36, 38 each comprise a diode or a zener diode or more, and the current passing element 39 comprises a fourth resistor. The function of this arrangement 1 is explained in the view of FIG. 4.

Figure 4:
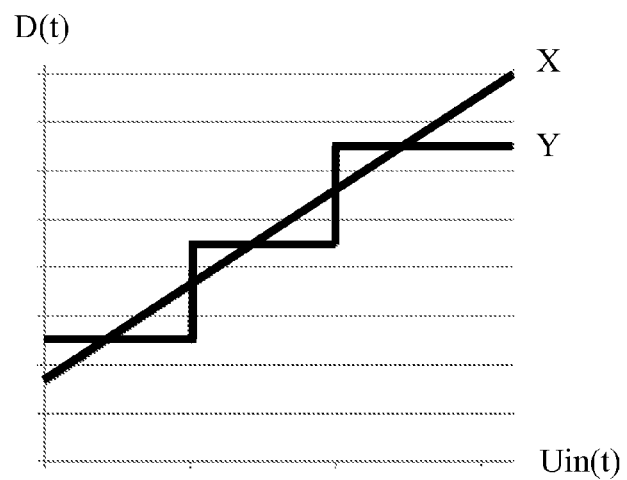
FIG. 4 shows a duration D(t) versus an amplitude of a voltage signal Uin(t) for an ideal situation X and an approximated situation Y.

In FIG. 4, a duration D(t) versus an amplitude of a voltage signal Uin(t) is shown for an ideal situation X and an approximated situation Y. As derived above, in an ideal situation the duration D(t) should depend on the amplitude of the voltage signal Uin(t) as shown in the graph for the ideal situation X. In the arrangement 1 as shown in the FIG. 3, the duration D(t) depends on the amplitude of the voltage signal Uin(t) as shown in the graph for the approximated situation Y. Clearly, this is an approximation, wherein the ideal situation is approximated stepwise. More steps and/or steps of other sizes are not to be excluded and may be realized via additions and/or alterations to the arrangement 1 as shown in the FIG. 3.

Figure 5:
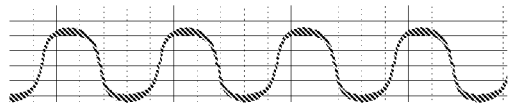
FIG. 5 shows an input current and a distortion without compensation (two upper graphs), and an input current and a distortion with compensation (two lower graphs)
Figure 5:
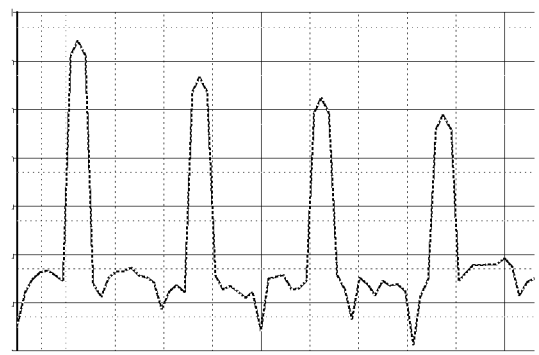
Figure 5:
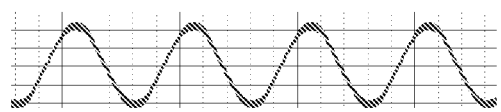
Figure 5:
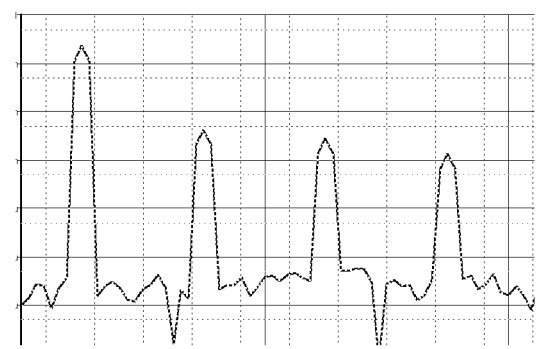

In FIG. 5, an input current and a distortion without compensation are shown in the two upper graphs for a prior art converter and an input current and a distortion with compensation are shown in the two lower graphs for a converter comprising the arrangement 1 as shown in the FIG. 3. The horizontal scale for the input current graphs is 20 ms/division, the vertical scale is equal for both graphs. The horizontal scale for the distortion graphs is 200 Hz/division and the vertical scale is logarithmic, with each division representing a factor of ten. Clearly, in the upper graphs there is more distortion than in the lower graphs. Note for example the larger amplitude of the third harmonic at 150 Hz (second peak from the left) in the upper distortion sketch and the smaller amplitude of the third harmonic at 150 Hz (second peak from the left) in the lower distortion sketch.

Alternatively, the controller 2 may be of a type such that the duration D(t) of the conducting time of the switch 3 is defined by an external element connected to ground, wherein an increased value of the external element results in an increased duration of the conducting time of the switch 3 and a decreased value of the external element results in a decreased duration of the conducting time of the switch 3. This external element may be for example a resistor (FIG. 6) or a capacitor (FIG. 7).

Figure 6:
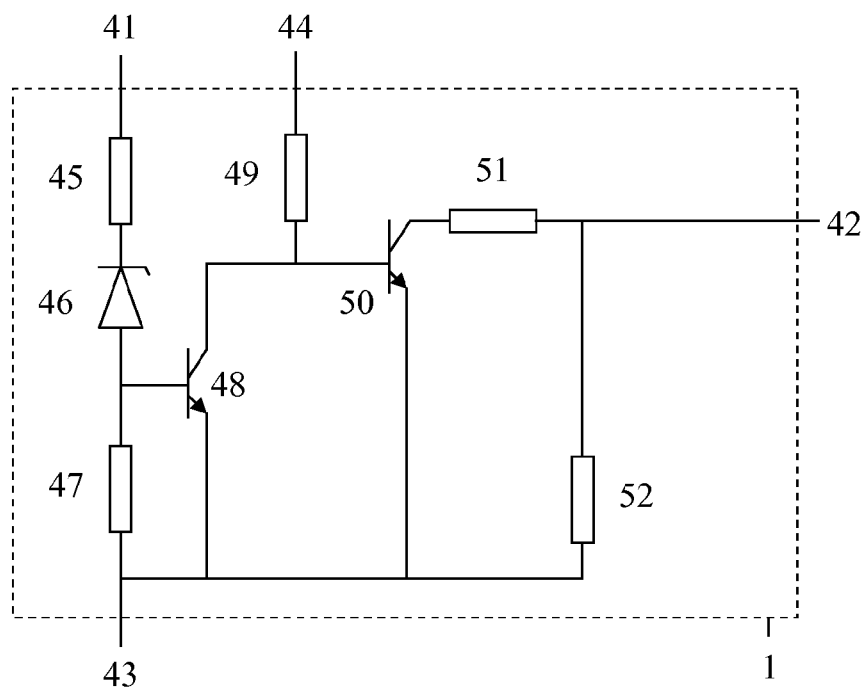
FIG. 6 shows a second arrangement.

In FIG. 6, a second arrangement 1 is shown. The external element here is an external resistor to be coupled to a control input of the controller 2. This external resistor is to be replaced by the arrangement 1 shown in FIG. 6. This arrangement 1 comprises an input terminal 41 for receiving the voltage signal, an output terminal 42 to be coupled to the control input of the controller 2, a common terminal 43 and a further terminal 44 to be coupled to a supply terminal of the controller 2. This arrangement 1 further comprises a first serial connection of a first resistor 45 coupled to the input terminal 41, a voltage defining element 46 and a second resistor 47 coupled to the common terminal 43, a first transistor 48 of which a control electrode is coupled to an interconnection between the voltage defining element 46 and the second resistor 47 and of which a first main electrode is coupled to the common terminal 43 and of which a second main electrode is coupled via a third resistor 49 to the further terminal 44 and to a control electrode of a second transistor 50 of which a first main electrode is coupled to the common terminal 43 and of which a second main electrode is coupled via a second serial connection of a fourth resistor 51 and a fifth resistor 52 to the common terminal 43. An interconnection between the fourth resistor 51 and the fifth resistor 52 is coupled to the output terminal 42. This arrangement 1 increases (decreases) a resistance value present between the output terminal 42 and the common terminal 43 for an increasing (decreasing) voltage signal (lower voltage signal: The parallel connection of the resistors 51 and 52 is seen when looking into the output terminal 42; higher voltage signal: Only the resistor 52 is seen etc.).

Figure 7:
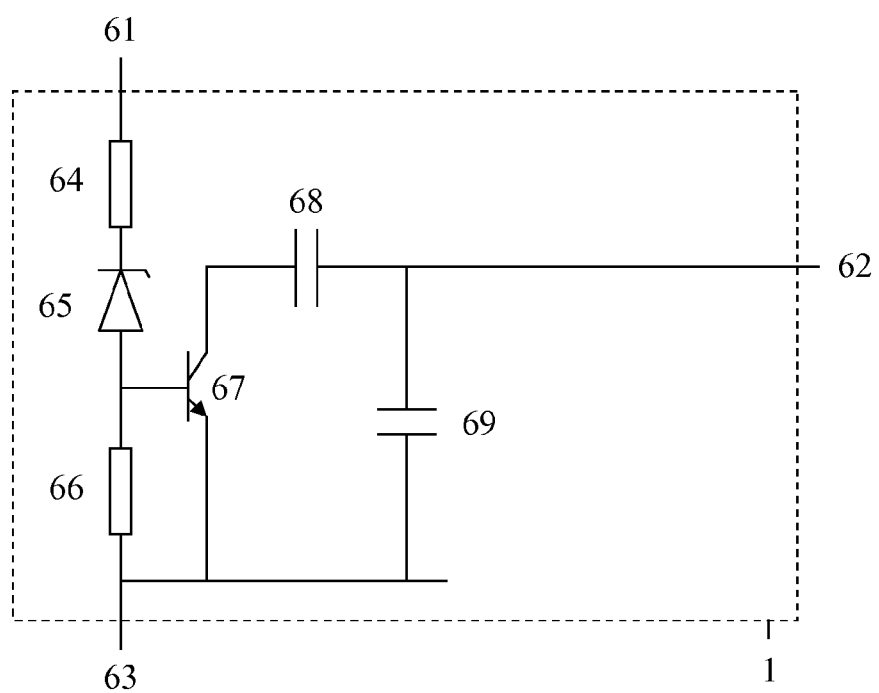
FIG. 7 shows a third arrangement.

In FIG. 7, a third arrangement 1 is shown. The external element here is an external capacitor to be coupled to a control input of the controller 2. This external capacitor is to be replaced by the arrangement 1 shown in FIG. 7. This arrangement 1 comprises an input terminal 61 for receiving the voltage signal, an output terminal 62 to be coupled to the control input of the controller 2 and a common terminal 63. This arrangement 1 further comprises a first serial connection of a first resistor 64 coupled to the input terminal 61, a voltage defining element 65 and a second resistor 66 coupled to the common terminal 63, a transistor 67 of which a control electrode is coupled to an interconnection between the voltage defining element 65 and the second resistor 66 and of which a first main electrode is coupled to the common terminal 63 and of which a second main electrode is coupled via a second serial connection of a first capacitor 68 and a second capacitor 69 to the common terminal 63. An interconnection between the first capacitor 68 and the second capacitor 69 is coupled to the output terminal 62. This arrangement 1 increases (decreases) a capacitance value present between the output terminal 62 and the common terminal 63 for an increasing (decreasing) voltage signal (lower voltage signal: Only the capacitor 69 is seen when looking into the output terminal 62; higher voltage signal: The parallel connection of the capacitors 68 and 69 is seen etc.).

For FIGS. 6 and 7, the voltage defining elements 46, 65 may each comprise a diode or a zener diode or more. More stages and/or other stages within the arrangement 1 are not to be excluded.

Two elements may be connected/coupled directly without another element in between, and they may be connected/coupled indirectly with another element in between. Instead of a transistor, any other kind of switch may be used. Other kinds of voltage defining elements are not to be excluded. Further elements may be present anywhere.

The converter comprising the arrangement according to the invention adjusts the duration of the conducting time of the switch over an entire mains period and not just near zero crossings of an original mains signal. The converter comprising the arrangement according to the invention is advantageous for the following reasons: it is a single-stage converter that can be used for lighting applications, especially light emitting diodes; it has a high displacement power factor and a high distortion power factor; it can be easily made dimmer compatible; it has a good performance; and it will reduce losses in the grid and power generators.

Summarizing, to reduce distortions and increase distortion power factors in fly-back and buck-boost converters 21, 22, arrangements 1 are introduced for adjusting control signals generated by controllers 2 for controlling switches 3 of the converters. The arrangements 1, in response to increased/decreased amplitudes of voltage signals from voltage supplies 4 for feeding the converters, increase/decrease durations of conducting times of the switches 3. This way, unwanted losses in the grid and power generators are avoided. The converters are relatively low-cost single-stage converters. Preferably, the durations are substantially proportional to the sums of the amplitudes of the voltage signals and design parameters. These design parameters may comprise amplitudes of other voltage signals such as output voltages. Arrangements 1 are provided for controllers 2 that can produce only fixed durations as well as for controllers 2 that can produce adaptable durations via adaptable external elements.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A controller for controlling a switch of a converter, the converter configured to be coupled to a voltage supply, the controller configured to be coupled to the voltage supply and further configured to:
   receive a voltage signal of the voltage supply; and
   generate a control signal such that a duration of conducting time of the switch of the converter is longer at a higher instantaneous amplitude of the voltage signal and that the duration of the conducting time of the switch is shorter at a lower instantaneous amplitude of the voltage signal,
   wherein the control signal is such that the duration of the conducting time of the switch is substantially proportional to a sum of the amplitude of the voltage signal and an amplitude of another voltage signal,
   wherein the controller further comprises a circuit comprising: an input terminal for receiving the voltage signal, an output terminal to be coupled to a control input of the controller, and a common terminal, a transistor coupled to the common terminal, and a serial connection of at least one capacitor coupled to the common terminal, wherein the at least one capacitor is coupled to the output terminal.

2. A controller as defined in claim 1, wherein the converter comprises a fly-back converter, the fly-back converter comprising a transformer with a primary coil coupled to the switch and with a secondary coil to be coupled to a load, the another voltage signal comprises an output voltage of the secondary coil multiplied by a number of windings of the primary coil and divided by a number of windings of the secondary coil.

3. The controller as defined in claim 1, wherein the converter comprises a buck-boost converter, the buck-boost converter comprising a coil coupled to the switch and to be coupled to the load, the other voltage signal comprises an output voltage of the coil multiplied by a number of windings of an input part of the coil and divided by a number of windings of an output part of the coil.

4. A controller for controlling a switch of a converter, the converter configured to be coupled to a voltage supply, the controller configured to be coupled to the voltage supply and further configured to:
   receive a voltage signal of the voltage supply; and
   generate a control signal such that a duration of conducting time of the switch of the converter is longer at a higher instantaneous amplitude of the voltage signal and that the duration of the conducting time of the switch is shorter at a lower instantaneous amplitude of the voltage signal;
   wherein the control signal is such that the duration of the conducting time of the switch is substantially proportional to a sum of the amplitude of the voltage signal and an amplitude of another voltage signal;
   wherein the controller further comprises a circuit, the circuit comprising:
   an input terminal for receiving the voltage signal, an output terminal to be coupled to a control input of the controller, and a common terminal,
   a parallel connection of a first resistor,
   a first serial connection of a second resistor,
   a second serial connection of a third resistor, and
   a current passing element,
   wherein the parallel connection is coupled to the input terminal and the output terminal, and wherein the current passing element is coupled to the output terminal and the common terminal.

5. The controller as defined in claim 4, the voltage defining elements each comprising a diode or a zener diode, and the current passing element comprising a fourth resistor.

6. A controller for controlling a switch of a converter, the converter configured to be coupled to a voltage supply, the controller configured to be coupled to the voltage supply and further configured to:
   receive a voltage signal of the voltage supply; and
   generate a control signal such that a duration of conducting time of the switch of the converter is longer at a higher instantaneous amplitude of the voltage signal and that the duration of the conducting time of the switch is shorter at a lower instantaneous amplitude of the voltage signal, wherein the control signal is such that the duration of the conducting time of the switch is substantially proportional to a sum of the amplitude of the voltage signal and an amplitude of another voltage signal, wherein the controller further comprises a circuit, the circuit comprising:

an input terminal for receiving the voltage signal, an output terminal to be coupled to a control input of the controller, a common terminal, and a further terminal to be coupled to a supply terminal of the controller, a first transistor coupled to the common terminal, a third resistor coupled to the further terminal and a second transistor, and a serial connection of at least one resistor coupled to the common terminal, wherein the at least one resistor is also coupled to the output terminal.

7. A fly-back converter or a buck-boost converter comprising a controller as defined in claim 1.

8. A device comprising a fly-back converter or a buck-boost converter as defined in claim 1 and further comprising a load.

9. A controller as defined in claim 6, wherein the converter comprises a fly-back converter, the fly-back converter comprising a transformer with a primary coil coupled to the switch and with a secondary coil to be coupled to a load, the another voltage signal comprises an output voltage of the secondary coil multiplied by a number of windings of the primary coil and divided by a number of windings of the secondary coil.

10. The controller as defined in claim 6, wherein the converter comprises a buck-boost converter, the buck-boost converter comprising a coil coupled to the switch and to be coupled to the load, the other voltage signal comprises an output voltage of the coil multiplied by a number of windings of an input part of the coil and divided by a number of windings of an output part of the coil.

* * * * *